United States Patent [19]

Harrington

[11] Patent Number: 5,546,454
[45] Date of Patent: Aug. 13, 1996

[54] AUTOMATIC CALL DISTRIBUTOR WITH TELEPHONIC CALL HOLDING SYSTEM

[76] Inventor: Noreen A. Harrington, 1818 Appaloosa Dr., Naperville, Ill. 60565

[21] Appl. No.: 215,839

[22] Filed: Mar. 21, 1994

[51] Int. Cl.$^6$ .................................... H04Q 3/64
[52] U.S. Cl. .................. 379/265; 379/162; 379/214; 379/393; 379/164; 379/157
[58] Field of Search ..................... 379/157, 162, 379/163, 164, 210, 211, 212, 208, 214, 218, 265, 266, 309, 393, 396

[56] References Cited

U.S. PATENT DOCUMENTS

| | | | |
|---|---|---|---|
| 4,132,860 | 1/1979 | Rasmussen | 379/163 |
| 4,203,011 | 5/1980 | Coviello | 379/165 |
| 4,588,864 | 5/1986 | Carter et al. | 379/163 |
| 4,628,153 | 12/1986 | Daly | 379/164 |
| 4,638,124 | 1/1987 | Hargrave et al. | 379/159 |
| 4,694,483 | 9/1987 | Cheung | 379/164 |

Primary Examiner—Jeffery Hofsass
Assistant Examiner—Parag Dharia

[57] ABSTRACT

An automatic call distributor (20) having a multiport switch (22) controlled by a central control unit (24) for interconnecting telephonic calls received from external telephonic units (28) of an external telephonic public switching network (30) with multiline internal telephonic units (32A–N) and for interconnecting telephonic calls from other internal telephonic units (32A–N) coupled with the call distributor (20), with a telephonic call holding system (25) for removing a hold placed on one of a plurality of lines representative of line keys (44A, 44B, 44C) of a multiline internal telephonic unit (32A) and for causing the central control unit (24) to automatically place another hold on another line of the internal telephonic unit (32A) in response to receipt of a signal from a basic rate line circuit (36) upon actuation of a key at the internal telephonic unit (32A) to remove the hold placed on the one of the plurality of lines representative of line keys (44A, 44B, 44C) of the internal telephonic unit (32A).

22 Claims, 14 Drawing Sheets

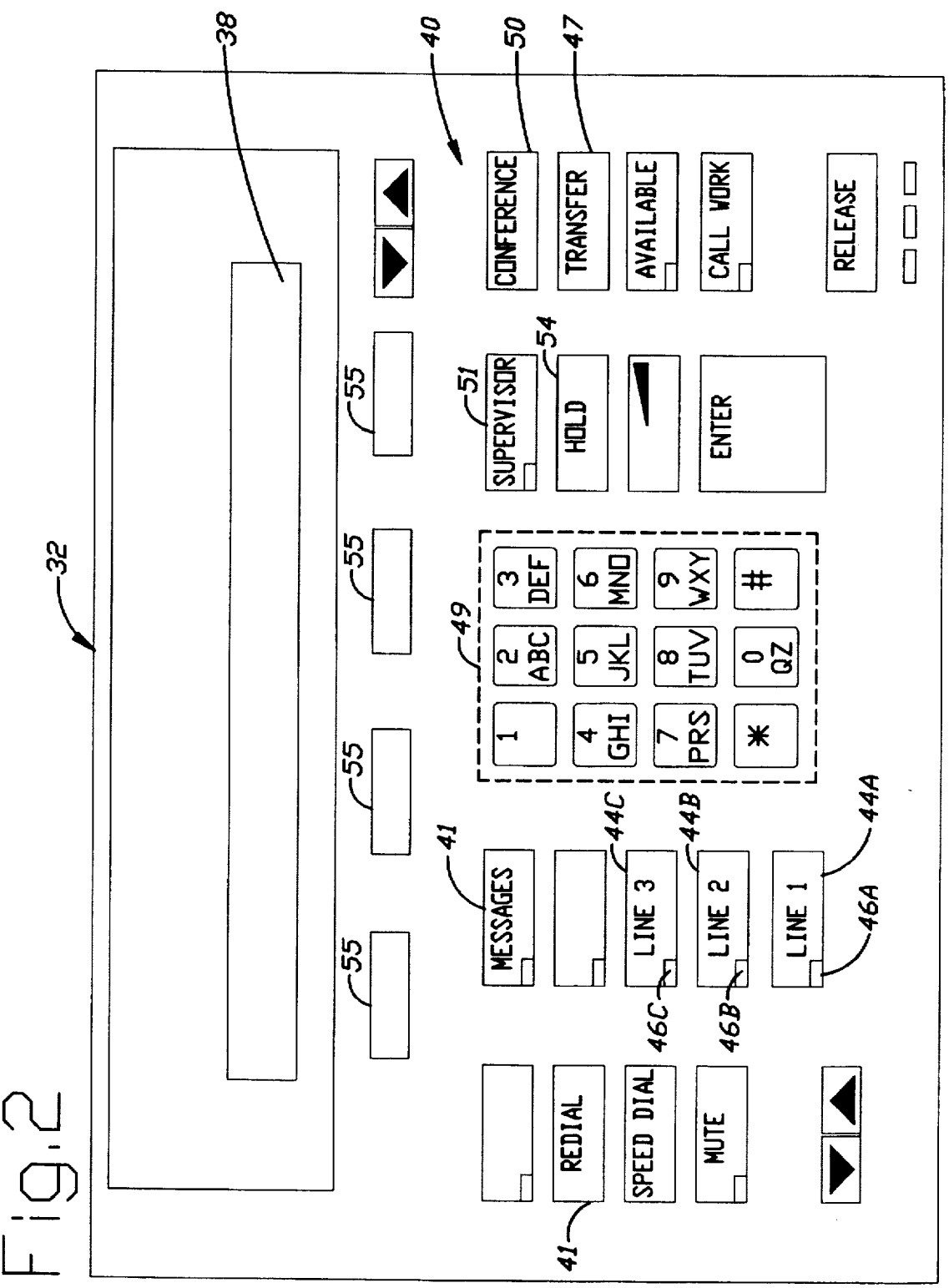

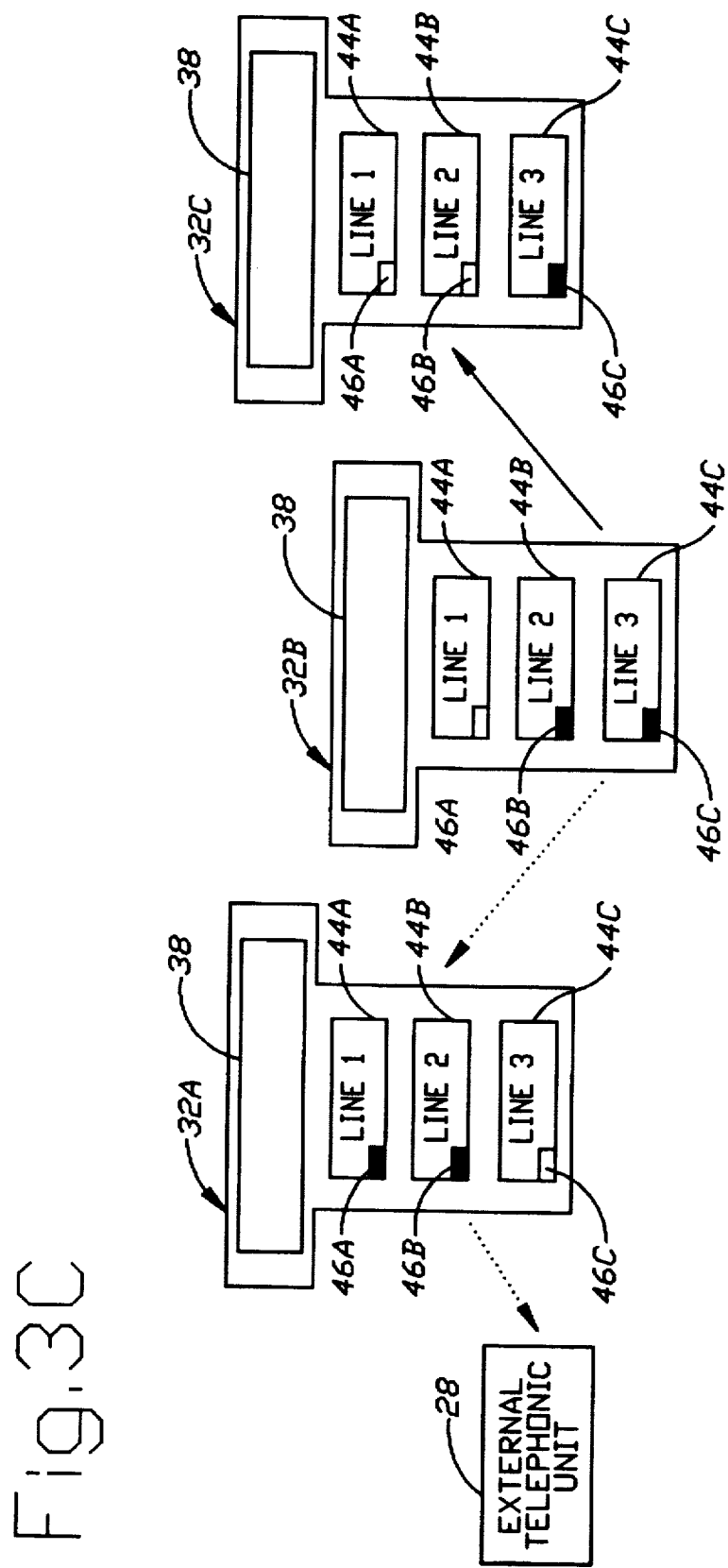

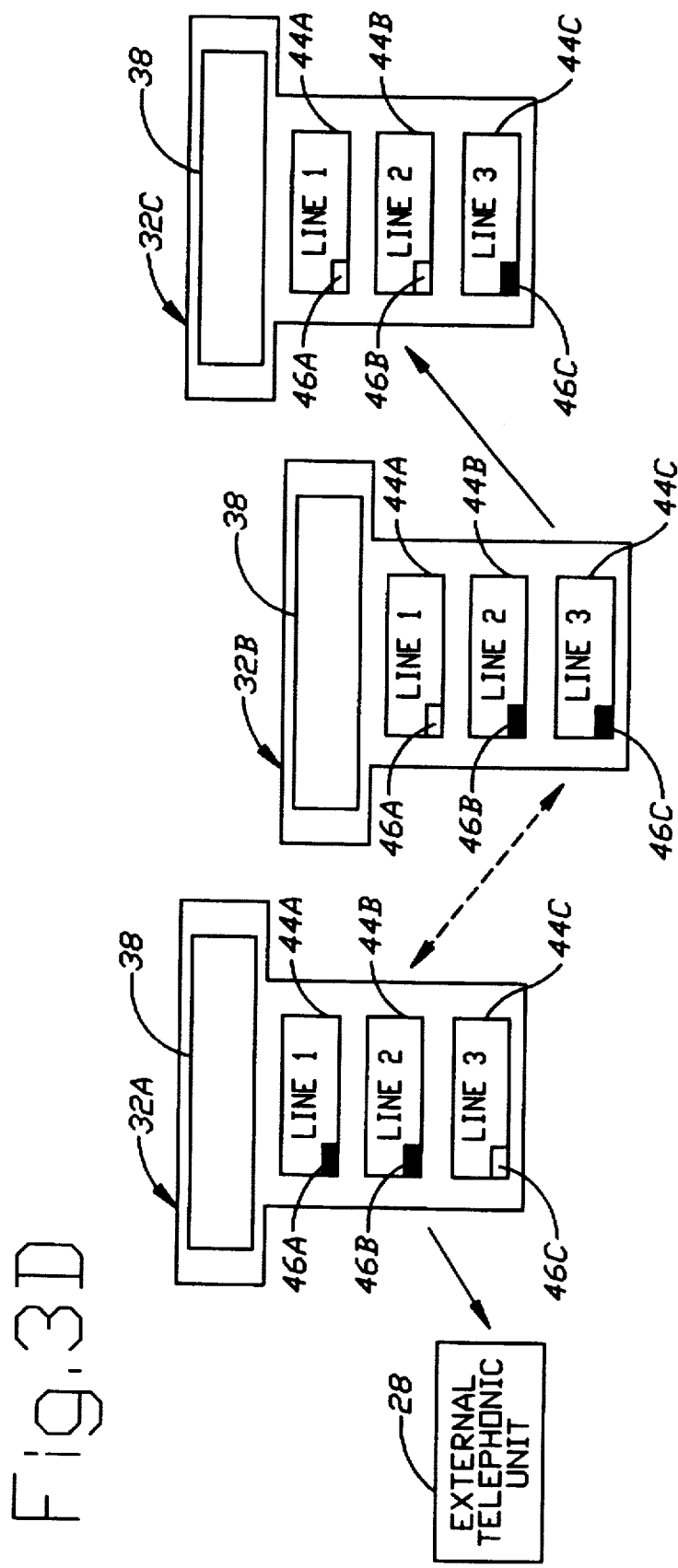

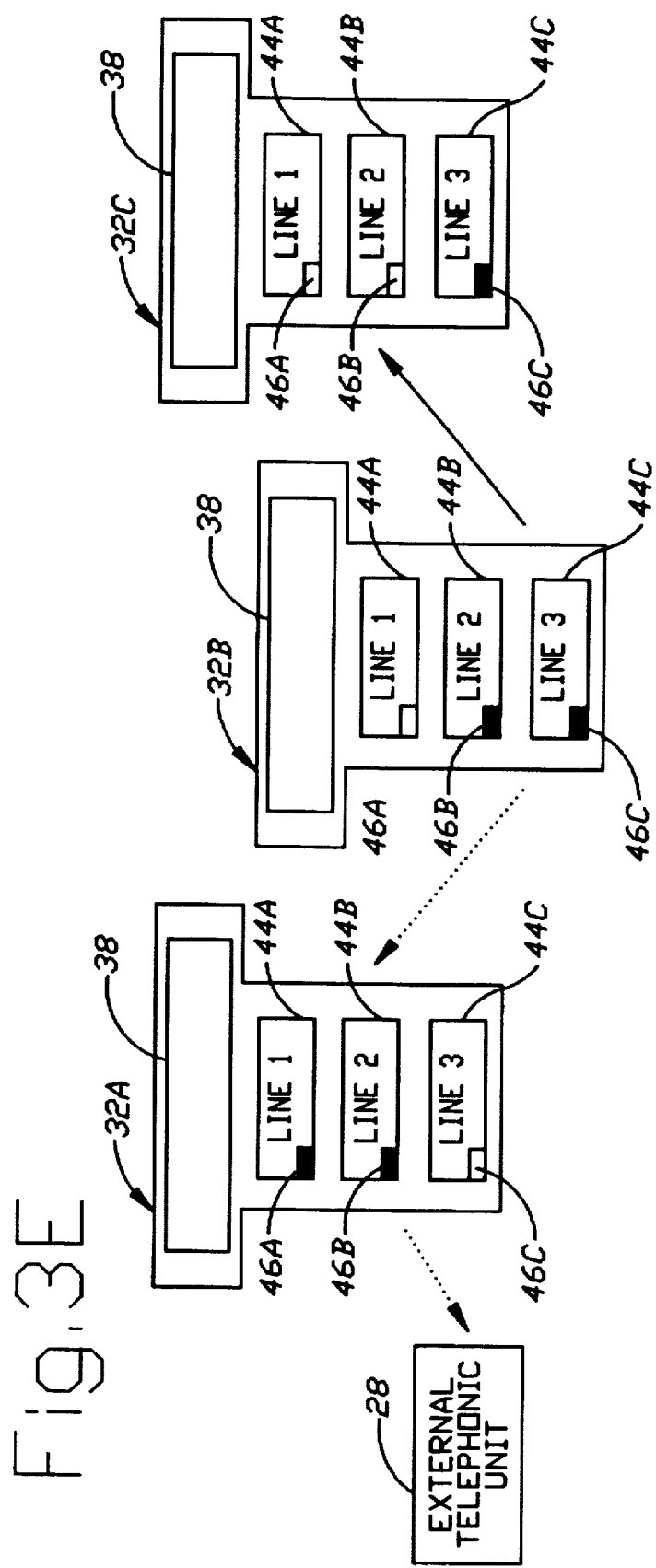

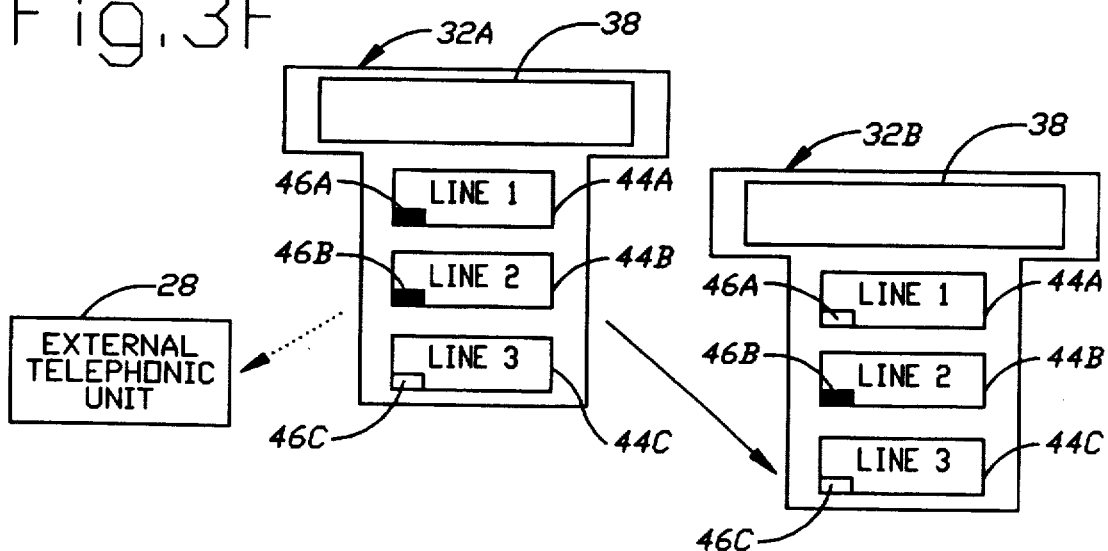
Fig. 3F
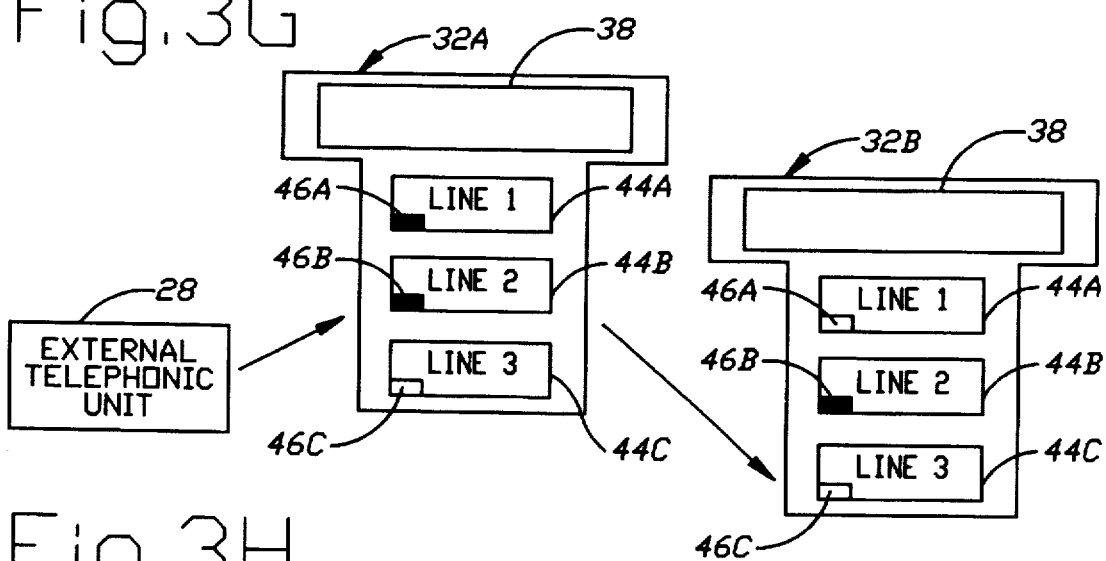
Fig. 3G
Fig. 3H
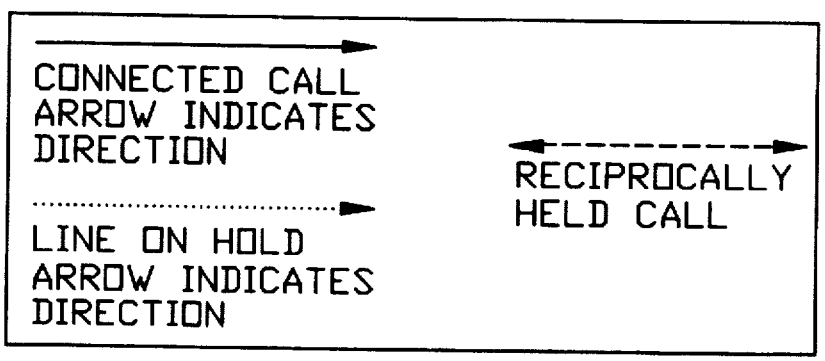

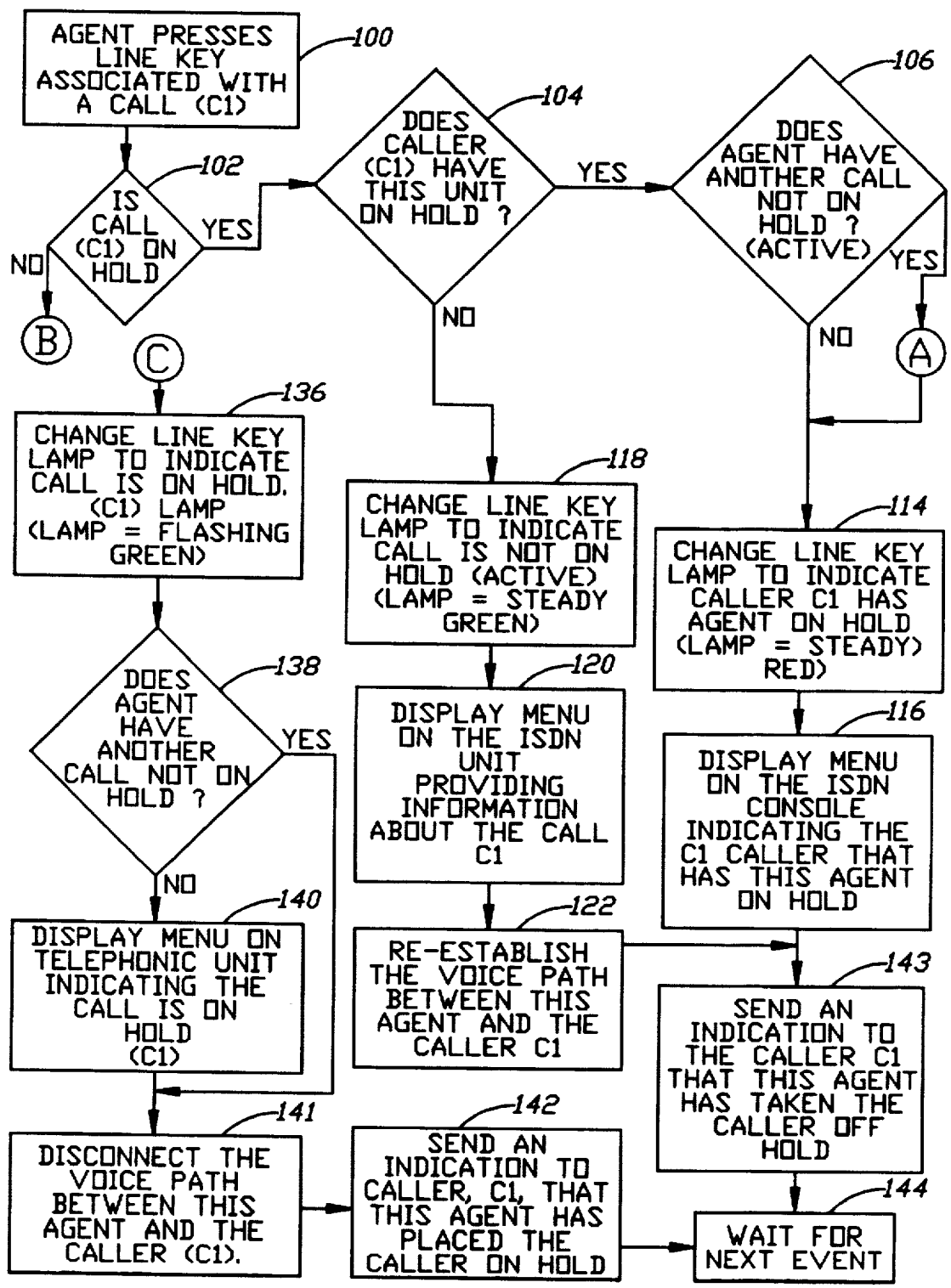

AUTOMATIC CALL DISTRIBUTOR WITH TELEPHONIC CALL HOLDING SYSTEM

BACKGROUND OF THE INVENTION

Field of the Invention

This invention relates generally to the field of automatic telephone call distributors and, more particularly, to such call distributors having a multiline internal telephonic unit which places a received call on hold on one line and performs an outdial call on another line of the internal telephonic unit.

Description of the Related Art Including Information Disclosed Under 37 C.F.R. §1.97–1.99.

Automatic call distributors employing a multiport switch controlled by a central control processing unit for selectively interconnecting agents stationed at a plurality of internal telephonic units with customers at external telephonic units via an external telephonic public switching network are well known. Examples of such call distributors are shown in patent application U.S. Pat. No. 5,268,903 of Jones et al. entitled "Multichannel Telephonic Switching Network With Different Signaling Formats and Connect/PBX Treatment Selectable For Each Channel" issued Dec. 7, 1993; U.S. Pat. No. 5,140,611 of Jones et al. entitled "Pulse Modulated Self-Clocking and Self-Synchronizing Data Transmission and Method for a Telephonic Communication Switching System" issued Aug. 18, 1992; U.S. Pat. No. 5,127,004 of Lenihan et al. entitled "Tone and Announcement Message Code Generator for a Telephonic Switching System and Method" issued Jun. 30, 1992 and U.S. Pat. No 4,627,047 of Pitroda et al. entitled "Integrated Voice and Data Telecommunications Switching System" issued Dec. 2, 1986.

An agent stationed at an internal telephonic unit in known call distribution systems frequently answers many different types of calls from customers during a working day. In many situations the agent requires assistance from another agent, a lead agent or a supervisor to obtain the proper information for servicing the customer call. The agent places the customer call on hold and dials the other agent or supervisor. However, the other agent or supervisor at another telephonic unit often is also not capable of answering all the questions asked by the customer to the original servicing agent. Therefore, the other agent or supervisor must place the agent servicing the call on hold and outdial another individual, such as another supervisor, having the relevant information for the customer. Therefore, in.this situation the agent servicing the call has the customer call placed on hold while at the same time is being held by the lead agent or supervisor to whom the agent called to request certain information.

Disadvantageously, in known call distributors, the agent is restricted from taking the customer call off of hold. Therefore, the agent cannot communicate with the calling customer to inform him or her that the information needed to answer a particular question is being researched by a supervisor. Unfortunately, in such known systems, the customer call is maintained on hold during the entire period required to answer the customer question or at least until the lead agent removes the servicing agent from being on hold. This is extremely annoying to the calling customers, since they cannot communicate with the servicing agents, and the customers have no knowledge of the status of their call. If there is a rather lengthy delay before the agent servicing the call is removed from being on hold, the customer, in many situations, will hang up, and a possible sale is lost from the aggravated customer.

Furthermore, in known call distribution systems when an agent has placed a received call on hold while at the same time is being placed on hold by another, the agent is restricted from making, transferring or receiving any other telephonic calls. This significantly limits the efficiency of the agent. The agent is placed in a state of confinement during the entire period in the agent's internal unit is being held by another. Agents are forced to wait without being able to perform any other actions at their respective internal telephonic units until they are removed from being on hold. Disadvantageously, in known automatic call distributors agents in this situation cannot outdial other individuals to aid in servicing calls, or accept calls received from other agents to help answer urgent questions. The restriction of such call related functions in known call distributors leads to inefficient call handling and increased customer dissatisfaction.

SUMMARY OF THE INVENTION

It is therefore a principal object of the present invention to provide an automatic call distributor with a telephonic call holding system in which the disadvantages of known call distributors noted above are overcome by enabling an agent at an internal telephonic unit to place on hold a line which is already being held by another internal telephonic unit.

This object is achieved in part by providing an automatic call distributor having a multiportswitch controlled by a central control unit for interconnecting telephonic calls received from external telephonic units of an external telephonic public switching network with internal telephonic units and for interconnecting telephonic calls from other internal telephonic units coupled with the call distributor with a telephonic call holding system comprising means at an internal telephonic unit for placing on hold one of a plurality of lines of another internal telephonic unit and means for enabling the other internal telephonic unit with the one of the plurality of lines being held to also put on hold the one of the plurality of lines being held by the internal telephonic unit.

Preferably, the object is achieved by a telephonic call holding system in which the enabling means only enables the other internal telephonic unit to also place on hold the one of the plurality of lines being held by the internal telephonic unit if at least one other line of the other internal telephonic unit has been placed on hold by the other internal telephonic unit.

The object is also achieved by providing an automatic call distributor having a multiport switch controlled by a central control unit for interconnecting telephonic calls received from external telephonic units of an external telephonic public switching network with internal telephonic units and for interconnecting telephonic calls received from other internal telephonic units coupled with the call distributor with a telephonic call holding system comprising means for removing a hold placed on one of a plurality of lines of an internal telephonic unit and means responsive to removing the hold placed on the one of the plurality of lines of the internal telephonic unit for automatically placing another hold on another line of the one internal telephonic unit.

Preferably, the object is further achieved by provision of an automatic call distributor which includes means for enabling the hold removing means to place the other hold on the other line when the other line is already being held.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 2 is a simplified plan view of a multiline internal telephonic unit coupled with the automatic call distributor of FIG. 1;

FIGS. 3A–3G are functional block diagrams representing changing call status relationships between an external telephonic unit and multiline internal telephonic units of the telephonic call holding system of the present invention during a continuous call scenario;

FIG. 3H is a legend for the call status arrow symbols used in FIGS. 3A–3G;

FIGS. 4A–4C are flow charts of the preferred method of placing telephonic calls at a multiline internal telephonic unit and indicating the call status of telephonic calls at various lines of the multiline internal telephonic unit coupled with the automatic call distributor of the present invention;

DESCRIPTION OF THE PREFERRED EMBODIMENT

Figure 1:
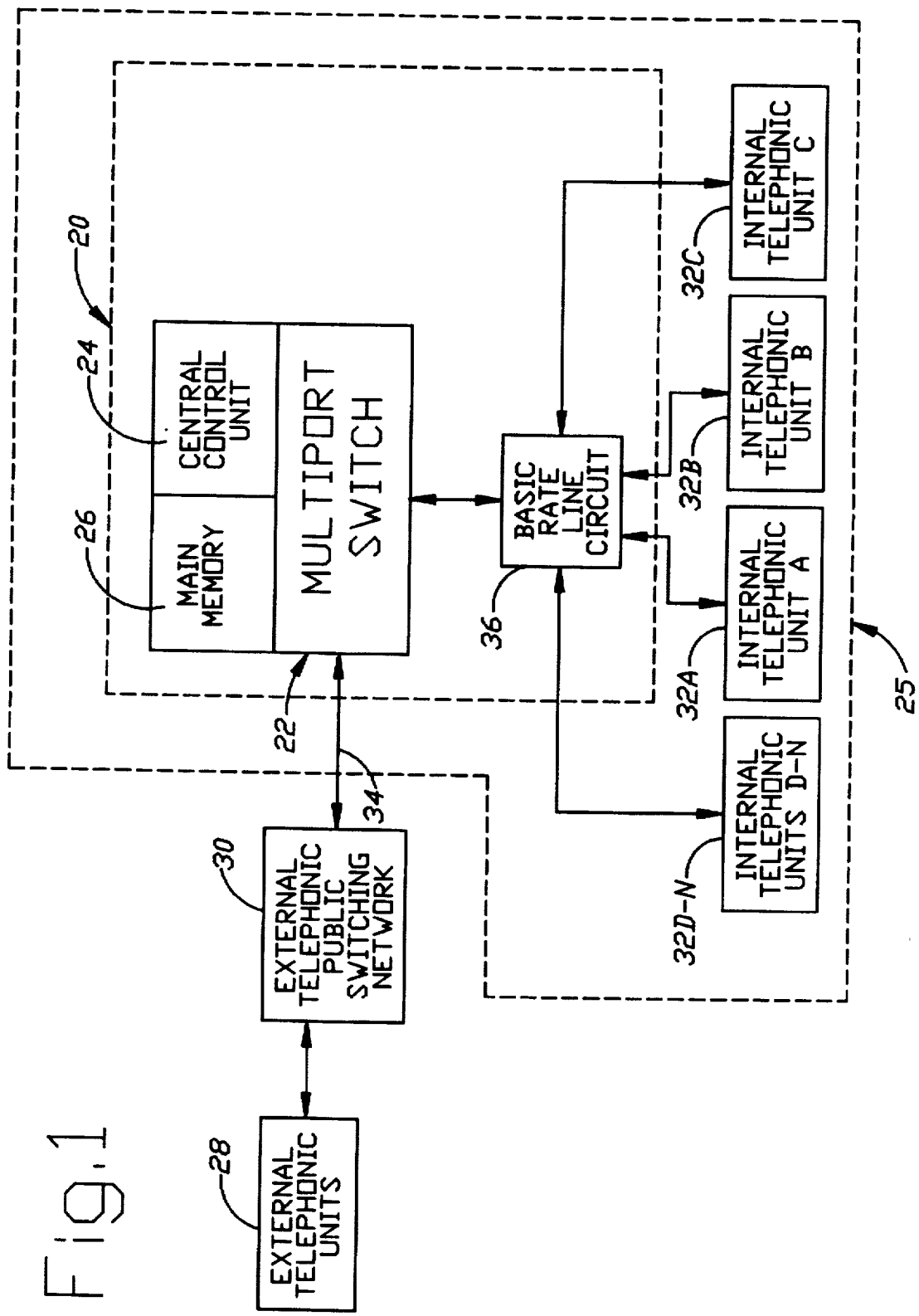
FIG. 1 is a functional block diagram of the preferred embodiment of the automatic call distributor of the present invention as interconnected with a known external telephonic public switching network with external telephonic units.

Referring to FIG. 1, the automatic call distributor 20 having a multiport switch 22 is controlled by a central control processing unit 24 in conjunction with a main memory 26 for selectively interconnecting telephonic calls received from external telephonic units 28 of an external telephonic public switching network 30 with a plurality of internal telephonic units 32A–N coupled with the call distributor. The multiport switch 22 of the automatic call distributor 20 connects with the external telephonic public switching network 30 over standard telephonic interface lines or trunks 34. The central control processing unit 24 is the primary controller for the automatic call distributor. In the preferred embodiment, the processing power for the central control unit 24 is provided by a thirty-two bit Motorola 68030 microprocessor. The central control unit 24 is a high-level processor where the application layer software in the main memory 26 is controlled. The central control processor unit 24 administers the call processing, reports, commands and maintains activity of the call distributor 20 under an OS9 operating system based execution environment.

The central control unit 24 is the processor which establishes telephonic call connections in the call distributor 20. The automatic call distributor 20 determines which internal telephonic units 32A–N receive telephonic calls made from callers at external telephonic units 28 of the external telephonic public switching network 30 and from other internal telephonic units associated with the call distributor. Generally while the telephonic call holding system 25 of the present invention can be implemented in numerous types and sizes of call distributors, it is preferably employed in a call distribution system of the types shown in U.S. Pat. No. 5,268,903 of Jones et al. entitled "Multichannel Telephonic Switching Network With Different Signaling Formats and Connect/PBX Treatment Selectable For Each Channel" issued Dec. 7, 1993; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992; U.S. Pat. No. 5,127,004 of Lenihan et al. entitled "Tone and Announcement Message Code Generator for a Telephonic Switching System and Method" issued Jun. 30, 1992 and U.S. Pat. No. 4,627,047 of Pitroda et al. entitled "Integrated Voice and Data Telecommunications Switching System" issued Dec. 2, 1986.

A service agent receives a telephonic call from an external telephonic unit 28 and is connected to the call at an internal telephonic unit 32A via the multiport switch 22 of the automatic call distributor 20. The internal telephonic units 32A–N are coupled through a basic rate line (BRL) interface circuit 36 to the multiport switch 22 and the central control unit 24. The basic rate line circuit 36 provides for the termination of Integrated Services Digital Network (ISDN) basic rate links from the multiport switch 22. The links are used in the automatic call distributor 20 of the preferred embodiment to connect the ISDN compatible interior telephonic units 32A–N in the telephonic call holding system 25. A Motorola 68000 microprocessor provides for the overall control of the BRL interface circuit 36.

Referring to FIG. 2, a simplified plan view of an internal telephonic unit 32 is shown having a liquid crystal display (LCD) 38 mounted on the keyboard 40 of the telephonic unit housing. The keyboard 40 has a plurality of keys 41 for activation of the internal telephonic unit functions upon actuation of the keys by an agent or operator at the unit. The LCD or display screen 38 on the keyboard 40 visually displays text information regarding the call status of the various telephone lines of the multiline internal telephonic unit 32. The interior telephonic unit 32 of the preferred embodiment is representative of a multiple telephone line instrument with line keys 44A, 44B and 44C. Line key 44A is representative of a call connection on line one; line key 44B is representative of a call on line two, and line key 44C is representative of a call on line three of the internal telephonic unit 32.

Within each line key 44A, 44B and 44C, a corresponding light signaling device, preferably a light emitting diode (LED) 46A, 46B and 46C is respectively located to visually indicate or signal the agent at the internal unit 32 of the status of a call on a particular telephone line. Additionally, the LCD screen 38 on the multiline internal telephonic unit 32 housing displays different call text messages to provide further indication of the different call conditions at the unit.

In response to a telephonic call connection at the internal telephonic unit 32 from an external telephonic unit 28 or another internal unit, the light signaling device 46A, 46B or 46C on the line key corresponding to the telephone line at which the call is on emits a steady green color. If the agent or operator at the internal telephonic unit 32 places a received telephone call on hold then the LED corresponding to the held call blinks or flashes a green color at a periodic rate. If an individual at another telephonic unit places the agent at the internal telephonic unit 32 on hold then the LED corresponding to the line at which the internal telephonic unit is being held emits a steady red color. If an agent at an internal telephonic unit 32 places another internal telephonic unit on hold after the individual at the other unit has placed the agent at the internal telephonic unit on hold then the corresponding LED flashes a blinking red color at a periodic rate. If an agent places another on hold while the other individual at another telephonic unit has also placed the agent on hold thereby creating a situation in which the agent and the other individual have each other on hold results in a condition called a reciprocal hold. Preferably, the multiple telephone line internal telephonic units 32 of the present invention are ISDN based telephonic consoles of the type described in U.S. Pat. application Ser. No. 07/976,630 of Dezonno et al. entitled "Automatic Call Distribution System With An ISDN Compatible Call Connection System and Method" filed Nov. 16, 1992.

Referring again to FIG. 1, the BRL interface circuit 36 receives signaling messages in response to actuation of the various keys 41, 44A, 44B, 44C from the ISDN based interior telephonic units 32A–N. The BRL interface circuit 36 performs initial validation of the key actuation. The BRL interface circuit 36 sends the appropriate indication signal for the activation of a key 41 to the central control unit 24 for further validation and processing. The central control unit 24 sends an indication to the BRL interface circuit 36 if the action is denied or sends information to the BRL interface circuit 36 which the BRL acts upon. The central control unit 24 further instructs the BRL interface circuit 36 to display specific call information on the LCD screen 38, FIG. 2, of the interior telephonic unit 32. The central control unit 24, FIG. 1., drives the BRL interface circuit 36 as to what information to display on the LCD screen 38, FIG. 2, and what cadence to flash the light emitting diodes 46A, 46B, 46C at the line keys 44A, 44B, 44C of the internal telephonic unit 32. The central control unit 34 further instructs the BRL interface circuit 36 as to what color to illuminate the light signaling devices 46A, 46B, 46C on the line keys 44C, 44B, 44C. The central control processing unit 24 state machine determines what actions are valid at any given state.

Figure 3A:
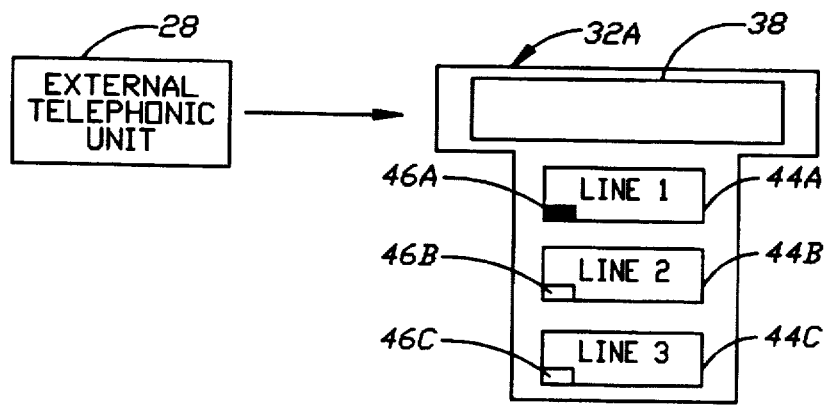

Referring now to FIG. 3A, an incoming call from an external telephonic unit 28 is distributed and answered on telephone line one at internal telephonic unit 32A. The LED 46A associated with line key 44A of internal telephonic unit 32A signals a steady green color, and the liquid crystal display screen 38 flashes relevant information pertaining to the connected call.

Figure 3B:
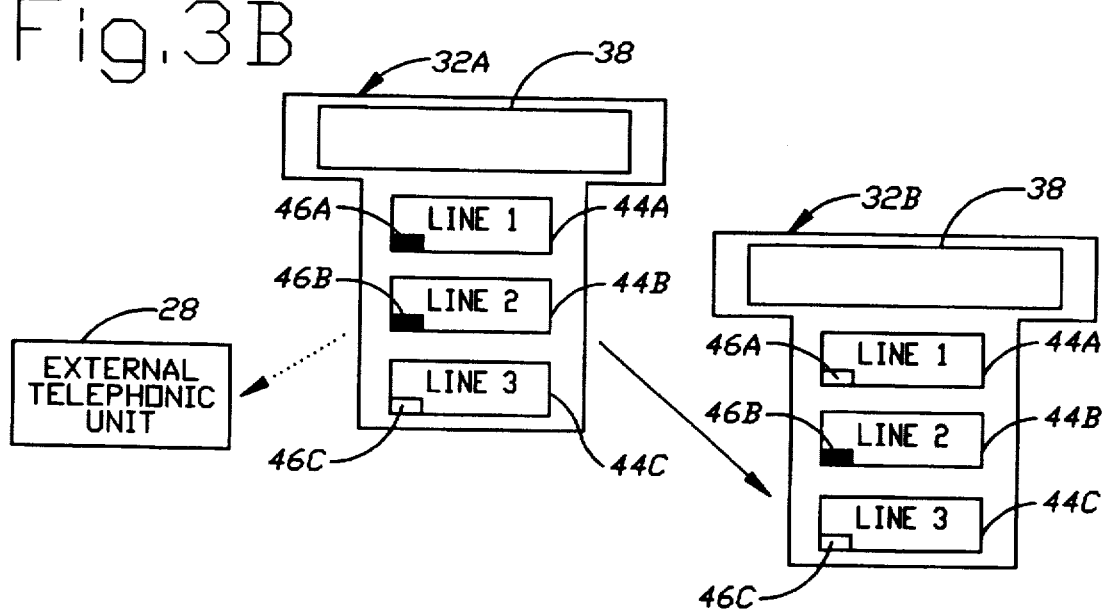

Referring to FIG. 3B, the agent stationed at internal telephonic unit 32A requires assistance and calls a lead agent stationed at internal telephonic unit 32B. The agent actuates line key 44B on the keyboard 40 of internal telephonic unit 32A and outdials to the lead agent at another internal telephonic unit 32B. The original call between the external telephonic unit 28 and internal telephonic unit 32A is automatically and implicitly placed on hold by the central control unit 24, FIG. 1, in response to the actuation of line key 44B, FIG. 3B, at the internal unit. The internal telephonic unit 32A shows a blinking green at the LED 46A of line key 44A to indicate that the external telephonic unit 28 is placed on hold on line one. The LED 46B on line key 44B shown a steady green color indicating the call connection on line two between internal telephonic unit 32A and internal unit 32B. The display screen 38 of the internal telephonic unit 32A flashes information indicating the connection with internal telephonic unit 32B. The internal telephonic unit 32B has a steady green color on the LED 46B indicating the call connected on line two, and the display screen flashes information relating to the connection with internal telephonic unit 32A.

Referring to FIG. 3C, the lead agent at internal telephonic unit 32B outdials on line three to a supervisor at internal telephonic unit 32C. The agent at internal telephonic unit 32A is implicitly placed on hold automatically in response to the actuation of line key 44C at internal telephonic unit 32B. In this situation, the internal telephonic unit 32A has placed the external telephonic unit 28 on hold and at the same time is being held by another internal telephonic unit 32B. Internal telephonic unit 32A has a blinking green on LED 46A and a steady red on LED 46B to indicate that it is being held on line two by the other internal telephonic unit 32B. The display screen 38 of internal unit 32A displays information indicating that it is being held by internal unit 32B. The other internal telephonic unit 32B provides a blinking green on LED 46B and a steady green on LED 46C. The screen 38 of internal unit 32B displays information indicating that it is connected with internal telephonic unit 32C.

Unlike known call distribution systems, the internal telephonic unit 32A of the present invention is not restricted from performing various features when the unit has placed a telephone line on hold and is also being held by another internal telephonic unit 32B on another line. The central control processing unit 24, FIG. 1, in conjunction with the main memory 26 of the automatic call distributor coupled with the multiline internal telephonic unit 32A, FIG. 3C, enables the internal telephonic unit 32A to place the line (e.g. line two) being held at another internal unit 32B on hold thereby creating an explicit reciprocal hold between internal telephonic unit 32A and internal telephonic unit 32B. The explicit reciprocal hold is preferably established on line two upon actuation of line key 44B at internal telephonic unit 32A when line two is already being held by internal telephonic unit 32B. Alternatively, actuation of hold key 54, FIG. 2, established a hold at a line of the multiline internal telephonic unit 32A. Internal telephonic unit 32A only places the line (e.g. line two) being held by internal telephonic unit 32B on hold if at least one other line (e.g. line one) of the internal telephonic unit 32A has been placed on hold by the internal telephonic unit 32A. Furthermore, the central control unit 24 enables internal telephonic unit 32A to remove the hold on line one between the internal unit and external telephonic unit 28 in response to the actuation of line key 44A representative of line one at the internal unit 32A.

Internal telephonic unit 32A places another unit 32B on hold while the other unit 32B maintains the placement of the hold on internal unit 32A, thereby creating a reciprocal hold. The respective LED lamps 46B, FIG. 3, on both internal telephonic units 32A and 32B flash a red color at a periodic rate to indicate the reciprocal hold. Line one is removed from being on hold, and LED 46A at internal telephonic unit 32A displays a steady green indicating an active or talking call connection. Alternatively, the hold on line one is removed by the agent actuating line key 44B associated with line two of internal unit 32A to explicitly place internal telephonic unit 32B on hold. Line key 44A is then actuated at unit 32A to remove the telephonic call received from external telephonic unit 28, FIG. 1, on line one from being on hold. A two way voice communication path is established on line one, representative of line key 44A, in response to the call on line one between external unit 28 and internal telephonic unit 32A being removed from being on hold. The agent at internal telephonic unit 32A is enabled to communicate with the caller or customer at external unit 28 to efficiently gather information from the customer.

As described in greater detail in FIGS. 4A–C, 5, 6, 7, 8 and 9, the agent at internal telephonic unit 32A, FIG. 3C, having one telephone line on hold and being held on another telephone line is enabled through the telephonic call holding system to initiate an outdial call to another telephonic unit, or transfer the telephonic call on the line placed on hold (line one) at the internal unit to a supervisor stationed at another or third internal telephonic unit 32C. Preferably, an outdial call is performed by an agent stationed at internal telephonic unit 32A actuating line two key 44B to place internal unit 32B reciprocally on hold. The agent actuates idle line key three 44C to initiate the outdial call. The LED 46C for line three emits a steady green color, and the screen 38 at internal telephonic unit 32A prompts the agent to enter the numeric digits on numeric keys 49, FIG. 2, for dialing out. The internal telephonic unit 32A preferably transfers an active call (a call not on hold) or a call which was last placed on hold to a tapped-in or barged-in supervisor call associated with a supervisor key 51, FIG. 2, of the internal unit 32A. The agent at internal telephonic unit 32A transfers the customer call received from external telephonic unit 28, FIG. 1, by removing the hold on line one connected with the external unit and then actuating the transfer key 47 on the internal unit. Alternatively, the agent at internal telephonic unit 32A removes external telephonic unit 28 from being on hold, and subsequently places the external unit back on hold thereby becoming the last held call and actuating the transfer key 47, FIG. 2.

The central control processing unit 24, FIG. 1, further provides the feature of connecting a telephonic call placed in a queue at the call distributor 20 to the internal telephonic unit 32A, FIG. 3C, if the telephone line (line one) placed on hold by the internal unit is the only line having a call associated with the plurality of telephone lines of the multiline internal telephonic unit 32A. The internal telephonic unit 32A is enabled to receive a telephonic call in queue at the automatic call distributor 20 if a call is reciprocally held at the internal telephonic unit. For example, in a situation in which internal telephonic unit 32A has external unit 28 on hold and is in a reciprocal hold with internal telephonic unit 32B, a call in queue at the automatic call distributor is received at internal unit 32A if external telephonic unit 28 is disconnected and the reciprocal hold is maintained. This allows the agent at internal telephonic unit 32A to continue to service newly received calls when another agent at internal unit 32B is attempting to gather information.

Referring now to FIG. 3D, the agent at internal telephonic unit 32A removes the external telephonic unit 28 from hold by actuating line one key 44A. The other internal telephonic unit 32B is implicitly put on hold by the central control unit 24, FIG. 1, automatically in response to the removal of the external telephonic unit 28 from being on hold. A reciprocal hold is created between the internal telephonic unit 32A, FIG. 3D, and the other internal telephonic unit 32B since each unit has placed the other unit on hold. The agent at internal telephonic unit 32A has a two-way voice communication path with the external telephonic unit 28. Internal telephonic unit 32A shows a steady green color for line one on LED 46A and a flashing or blinking red on LED 46B indicating the reciprocal hold with the other internal telephonic unit 32B on line two. The screen 38 of internal telephonic unit 32A displays call information about the connected called at the external telephonic unit 28. The other internal telephonic unit 32B shows a blinking red on LED 46B and a steady green on LED 46C. The display screen 38 on internal unit 32B provides information indicating the telephonic call connection with internal telephonic unit 32C.

Referring to FIG. 3E, the agent at internal telephonic unit 32A places the call at external telephonic unit 28 back on hold by actuating line one key 44A or by actuating the hold key 54 at the internal unit. Additionally, the agent removes the lead agent at internal telephonic unit 32B from being on hold by actuating the line two key 44B on the internal telephonic unit 32A. The internal telephonic unit 32A has LED 46A showing a blinking green and LED 46B showing a steady red color. The screen 38 of internal telephonic unit 32A displays information indicating that it is being held by internal telephonic unit 32B. The internal telephonic unit 32B shows a blinking green on LED 46B, a steady green on LED 46C and displays information on display screen 38 indicating the connection with internal telephonic unit 32C.

Referring to FIG. 3F, the lead agent at internal telephonic unit 32B releases the outdialed call to the supervisor at internal telephonic unit 32C, FIG. 3E, and removes the agent at internal telephonic unit 32A from being on hold. The lead agent at internal telephonic unit 32B removes internal unit 32A from being on hold by actuating line two key 44B on the other internal telephonic unit 32B. A two-way voice communication path is established between internal telephonic unit 32B, FIG. 3F, and internal unit 32A. Internal telephonic unit 32A has LED 46A showing a blinking green, LED 46B showing a steady green, and screen 38 displays information indicating the telephonic call connection with internal unit 32B. The internal telephonic unit 32B has a steady green color on LED 46B and its screen 38 displays information indicating the connection with internal unit 32A.

Referring to FIG. 3G, the agent at internal telephonic unit 32A establishes a conference with the external telephonic unit 28 and the other internal unit 32B. The information which the lead agent at internal telephonic unit 32B obtained from the supervisor at internal unit 32C, FIG. 3E, is given to the caller at external telephonic unit 28, FIG. 3G. The internal telephonic unit 32A shows a steady green at LED 46A and LED 46B. The screen 38 at internal unit 32A displays information indicating the establishment of a conference call. Internal telephonic unit 32B shows a steady green color at LED 46B, and the screen 38 displays information indicating the call connection with internal unit 32A.

Referring now to FIG. 4A, in step 100 an agent actuates a line key 44A, FIG. 2, on the internal telephonic unit 32A that is associated with a received call, C1. An event is sent from the BRL interface circuit 36 to the central control unit 24 requesting a hold. A check is made by the central control processor 24, FIG. 1, to determine if the received call, C1, is on hold in step 102, FIG. 4A. If the call is on hold, then in step 104, another check is made to determine if the caller has placed the agent at the internal telephonic unit 32A, FIG. 1, on hold. This check is made if the received call, C1, is an internal call received from a different internal telephonic unit 32C. The central control unit 24 determines if a reciprocal hold has been established between internal telephonic units of the telephonic call holding system 25 in step 104. If both the agent at internal telephonic unit 32A and the caller at a different internal telephonic unit 32C have each other on hold, then in step 106, FIG. 4A, a check is made to determine if the agent is servicing another call. The central control processor 24, FIG. 1, ascertains whether the agent at internal telephonic unit has an active call connected on another line (line two) of the unit.

Figure 4B:
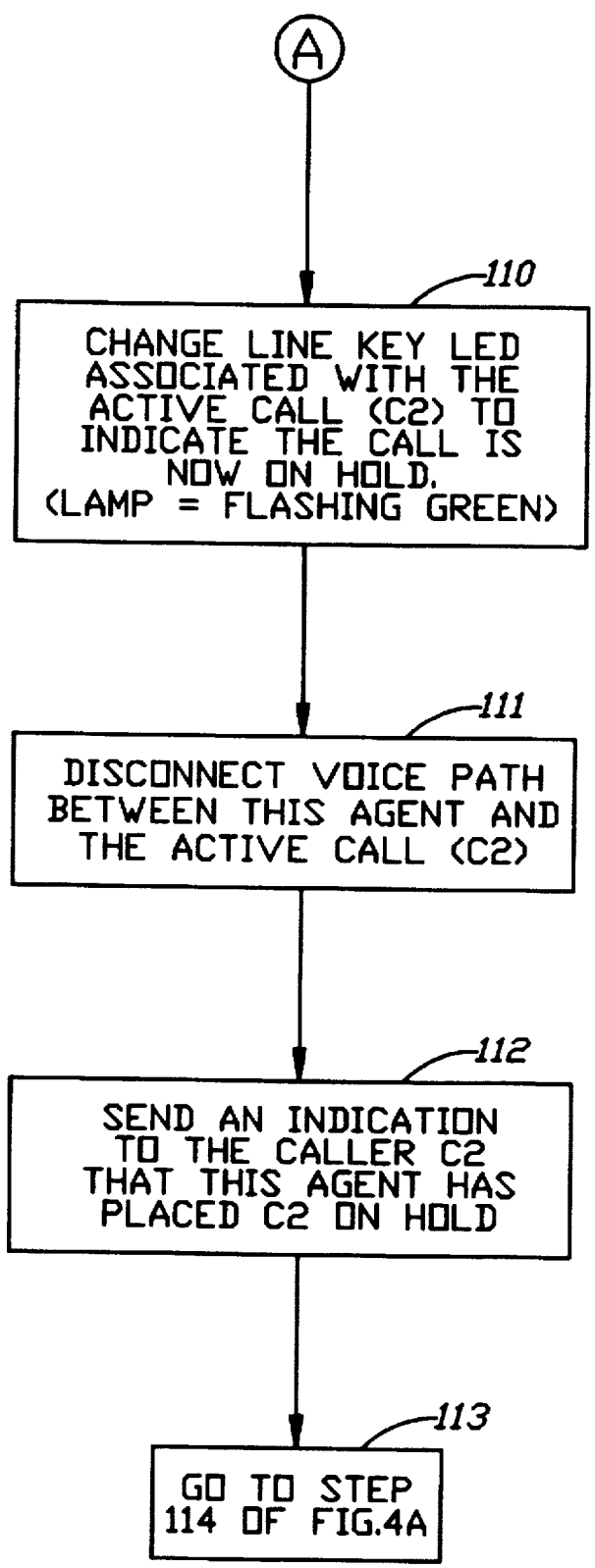

If the agent at internal telephonic unit 32A has active call, C2, on another telephone line, then the agent places the actively connected call, C2, on hold via steps 110–112 in FIG. 4B. To place the actively connected call, C2, on hold, the central control processor 24, FIG. 1, then instructs the BRL interface circuit 36 in step 110, FIG. 4B, to change the line key LED 44B, FIG. 2, associated with the active call, C2, on line two, to indicate the agent at internal unit 32B has placed the call on line two on hold. The line key LED 44B associated with line two displays a flashing green signal indicating the status of the call is on hold. In step 111, FIG. 4B, the voice path call is disconnected on line two of the internal telephonic unit 32A. In step 112, the central control unit 24 sends an indication to the other internal telephonic unit 32B indicating that the agent at internal unit 32A has placed the other internal unit 32B on hold on line two. At step 113, the system returns to step 114, FIG. 4A, to take the internal caller, C1 at internal telephonic unit 32C off hold.

Referring again to FIG. 4A, if the agent at internal telephonic unit 32A does not have an active two way voice path on another line, then in step 114 the central control processor 24, FIG. 1, instructs the BRL interface circuit 36 to change the line key lamp or LED 46A associated with the received call, C1, on line one to a steady red signal to indicate the caller at the internal telephonic unit 32C has the agent at the internal unit 32A on hold. The BRL interface circuit 36 is instructed, in step 116, FIG. 4A, to display a call status information on the display screen 38, FIG. 2, of the internal telephonic unit 32A, FIG. 1, to indicate the agent at the unit is being held by the internal caller at the internal telephonic unit 32C.

If the caller on call, C1, at either an external telephonic unit 28 or another internal telephonic unit 32B does not have the internal telephonic unit 32A on hold, then in step 118, the central control processing unit 24, FIG. 1, instructs the BRL interface circuit 36 to change the line key lamp 46A, FIG. 2, associated with the received call, C1, on line one to a steady green to indicate the agent at the internal telephonic unit 32A has taken the received call, C1, off hold. The BRL interface circuit 36, FIG. 1, is also instructed in step 120, FIG. 4A, to display the menu on the internal telephonic unit screen 38, FIG. 2, providing any call information associated with the received call. In step 122, FIG. 4A, a voice path is re-established between the agent at the internal telephonic unit 32A, FIG. 1, and caller at either an external telephonic unit 28 or another internal telephonic unit.

Figure 4C:
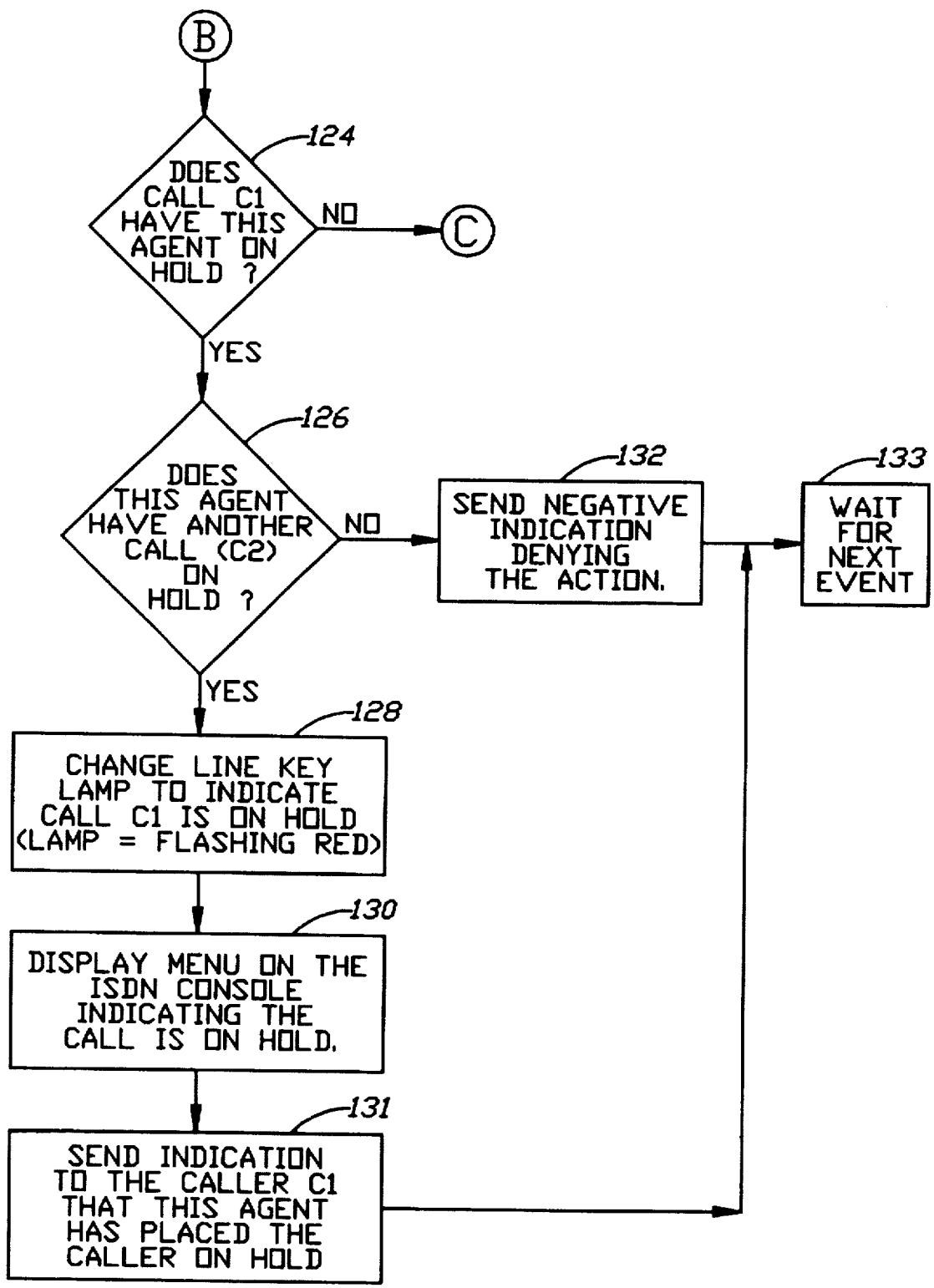

Referring to FIG. 4C, if the received call on line one is not on hold, then in step 124, a check is made to determine if the caller at the internal telephonic unit 32C, FIG. 1, has the agent at the internal telephonic unit 32A on hold. If the caller, C1, has the agent on hold, then in step 126, FIG. 4C, a check is made to determine if the agent has another call on another line of the internal unit 32A on hold. If the internal telephonic unit 32A has placed another call, C2, on hold, then in step 128 the central control unit 24 instructs the BRL interface circuit 36 to change the line key lamp 46A associated with the received call, C1, on line one to a flashing red thereby indicating the agent at the internal telephonic unit 32A has the received call on hold, and the caller at internal unit 32C has the agent at internal telephonic unit 32A on hold. The BRL interface circuit 36 is also instructed, in step 130, to display the menu on the screen 38 of the internal telephonic unit 32A indicating the agent has all calls on the telephone lines of the internal unit on hold. In step 131, FIG. 4C, an indication is sent by the central control unit 24, FIG. 1, to the caller, C1, on line one that the agent receiving the call at internal unit 32A has placed the caller on hold.

If the agent at the internal telephonic unit 32A does not have another call on hold, then in step 132, FIG. 4C, the central control processor sends a negative response to the BRL interface circuit 36 denying the action. In step 133, FIG. 4C, the central control unit 24 waits for the next event.

Referring again to FIG. 4A, if caller at the internal or external telephonic unit does not have the agent at internal telephonic unit 32A, FIG. 1, on hold, then in step 136, the central control unit 26 instructs the BRL interface circuit 36 to change the line key lamp 46A, FIG. 2, associated with the received call on line one to a flashing green thereby indicating the agent has placed the received call, C1, on hold. In step 138, a check is then made to determine if the agent at the internal unit 32A was in a conference call. If the agent at the internal telephonic unit 32A did have a conference, then in step 141, FIG. 4A, the voice path is disconnected between the agent at the internal unit 32A and caller. If the agent did not have a conference, then in step 140, FIG. 4A, the central control unit 24, FIG. 1, instructs the BRL interface circuit 36 to display the call status information on the screen 38 of the internal telephonic unit 32A thereby indicating all calls at the unit are on hold. The voice path is then disconnected between the agent and the caller in step 141, FIG. 4A. In step 142, the central control processing unit 24, FIG. 1, sends an indication to the caller that the agent at the internal telephonic unit 32A has placed the caller on hold. In step 144, FIG. 4A, the central control unit waits for the next event.

Figure 5:
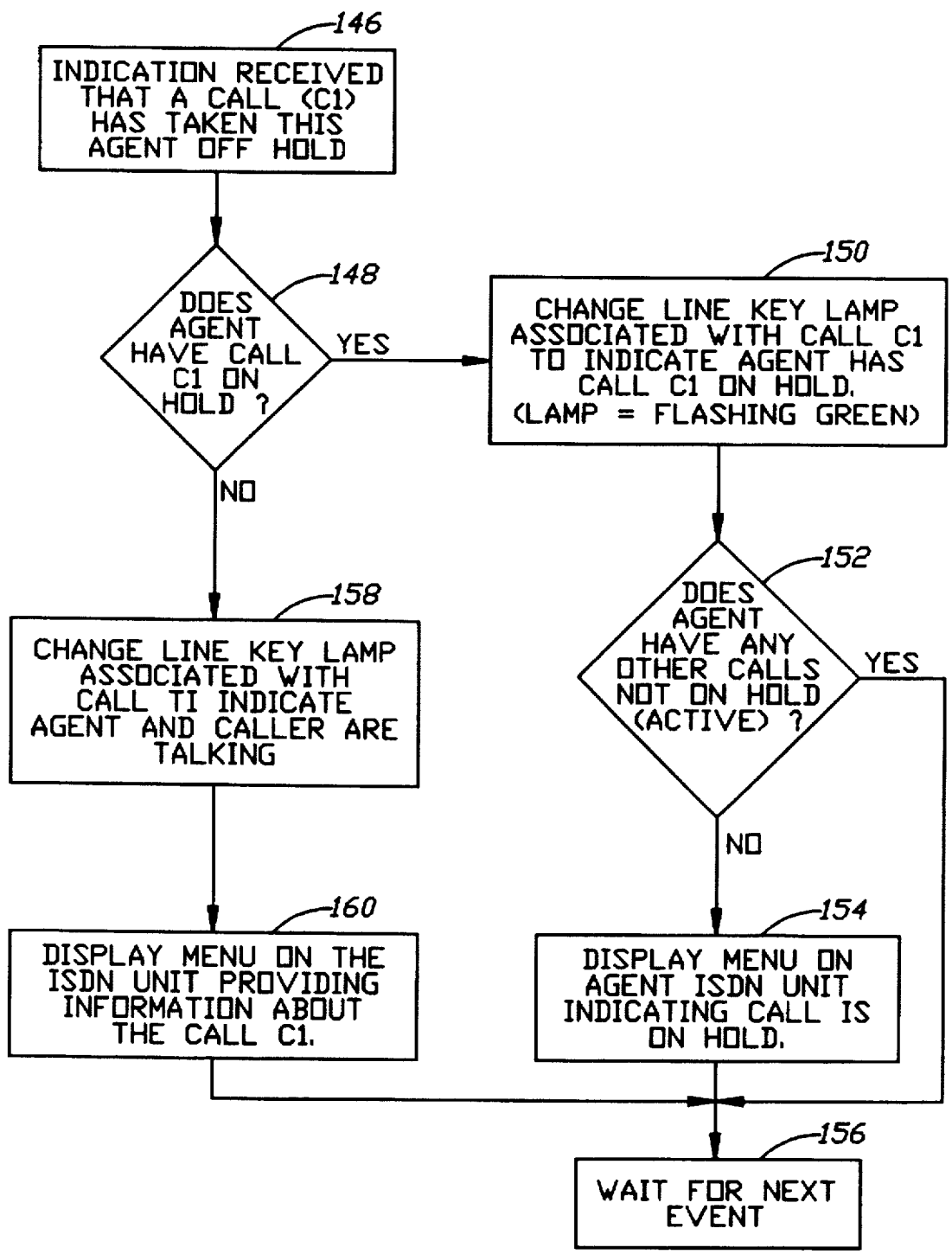
FIG. 5 is a flow chart of the preferred method of a telephonic call hold removal at a multiline internal telephonic unit and of indicating the call status at telephonic lines of the multiline internal telephonic unit of the present invention.

Referring now to FIG. 5, the state machine on the central control processing unit 24, FIG. 1, associated with the agent at the internal telephonic unit 32A receives an indication from the state machine on the central control unit associated with the caller C1 at another telephonic unit that caller C1 has taken the agent at internal unit 32A off of hold in step 146. In step 148, a check is made if the telephone line on the internal telephonic unit 32A taken off hold has the caller on the same line at the other telephonic unit on hold. If the agent at the internal unit 32A, FIG. 1, has caller at the other telephonic unit on hold, the central control unit 24 instructs the BRL interface circuit 36 in step 150, FIG. 5, to change the line key lamp or LED 44A associated with the call to display a flashing green indicating the agent has placed a call, C1, on hold but the other telephonic unit does not have the same telephone line at the internal telephonic unit 32A on hold. A check is then made in step 152, FIG. 5, to determine if the agent at the internal telephonic unit 32A currently has an active call not on hold on another line of the internal unit.

If the agent at the internal telephonic unit 32A is speaking with another caller on another line of the unit, no other actions are required and the central unit 24, FIG. 1, waits for the next event in step 156, FIG. 5. If the agent at internal telephonic unit 32A is not actively connected with another call on another line, the central control unit 24, FIG. 1, instructs the BRL interface circuit 36 to display the menu on the screen 38 the internal unit 32A to indicate that all calls at the internal unit are on hold in step 154, FIG. 5. If the agent at the internal telephonic unit 32A, FIG. 1, does not have the other internal telephonic unit 32B on hold, the central control unit 24 instructs, in step 158, the BRL interface circuit 36 to change the line key lamp, 44A, FIG. 2, associated with the received call on line one to a steady green thereby indicating the internal telephonic unit and the caller at the other telephonic unit have two way voice path communication. The central control unit 24, FIG. 1, instructs the BRL interface circuit 36, in step 160, FIG. 5, to display a menu on the display screen, 38, FIG. 2, of the internal telephonic unit 32A providing any call information associated with call on line one between the internal unit and the other telephonic unit which has removed the call on the line from being on hold. In step 156, FIG. 5, the central control unit 24, FIG. 1, waits for the next event.

Figure 6:
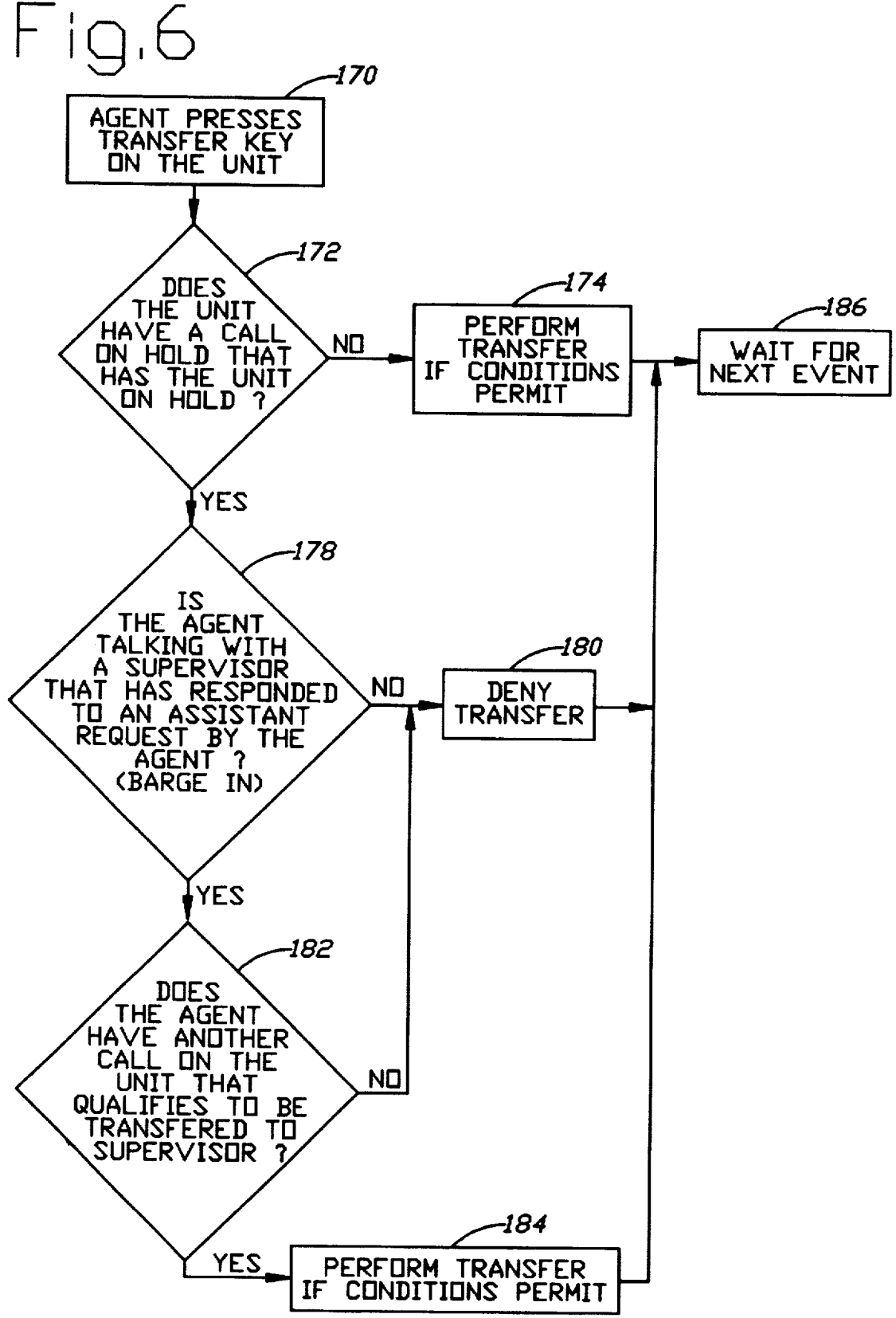
FIG. 6 is a flow chart of the preferred method of transferring a telephonic call from a multiline internal telephonic unit to another multiline internal telephonic unit of the automatic call distributor of the present invention.

Referring now to FIG. 6, the agent, at the internal telephonic unit 32A, FIG. 1, actuates the transfer key 47, FIG. 2, on the console, in step 170, FIG. 6. A check is made, in step 172, if the internal telephonic unit 32A has a call on hold that also has the internal unit on hold. If no reciprocal hold exists, then in step 174, FIG. 6, a transfer is performed according to the existing operation the automatic call distributor 20, FIG. 1. If a reciprocal hold exists, then in step 178, FIG. 6, a check is made if the agent at internal telephonic unit 32A is talking with a supervisor at another internal telephonic unit 32B, FIG. 1, that has responded to the assist request of the agent at internal telephonic unit 32A. Preferably, the supervisor has tapped-in or barged-in to the internal telephonic unit 32A to provide supervisory assistance and the call connection with the supervisor is associated with a supervisor key 51 on the unit. If the agent at internal unit 32A is not speaking with a barged-in supervisor, then in step 180, FIG. 6, the central control unit 24, FIG. 1, sends an indication to the BRL interface circuit 36 that the transfer request is denied. If the agent at the internal telephonic unit 32A is speaking on a telephone line with a supervisor, at another internal unit 32B, then in step 182, FIG. 6, a check is made if the agent has another call other than the reciprocally held call that qualifies to be transferred to the barged-in supervisor. If another call (call C2) on another line of the internal telephonic unit 32A exists and qualifies, then in step 184, FIG. 6, the transfer call C2, to the supervisor is performed.

If another call does not exist or does not qualify to be transferred to the supervisor at another internal telephonic unit, FIG. 1, then in step 180, FIG. 6, the central control unit 24, FIG. 1, sends an indication to the BRL interface circuit 36 that the transfer request is denied. In step 186, FIG. 6, the central control processing unit 24, FIG. 1, waits for then exit event.

Figure 7:
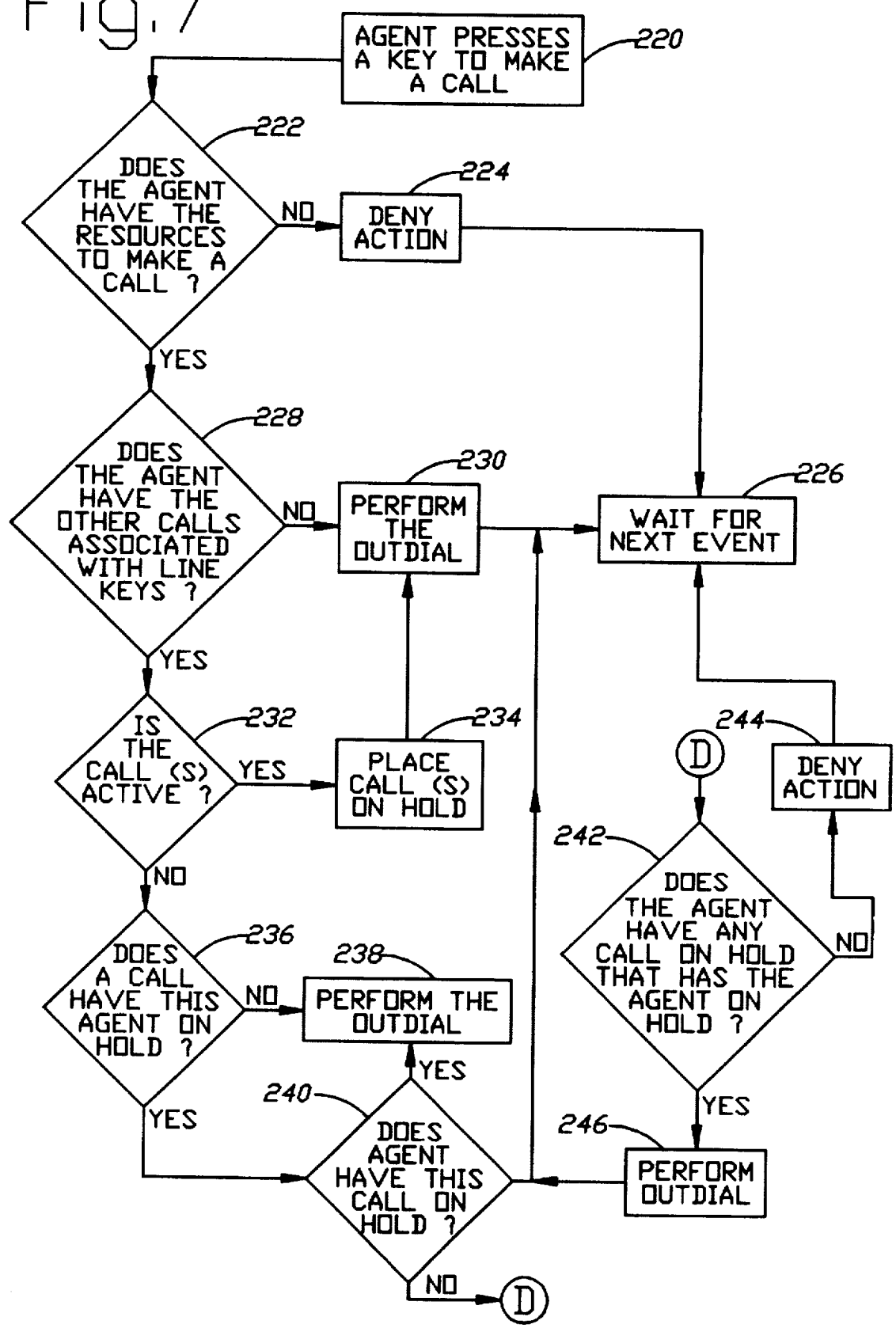
FIG. 7 is a flow chart of the preferred method of performing an outdial call at a multiline internal telephonic unit of the present invention.

Referring now to FIG. 7, the agent at the internal unit 32A, FIG. 1, actuates a line key to make an outdial call to an external telephonic unit or another internal telephonic unit, in step 220. In step 222, FIG. 7, a check is made if the particular agent at the internal unit is permitted to make an outdial call. If the agent at internal telephonic unit 32A is not assigned to perform an outdial call, then in step 224, FIG. 7, the central control unit 24 sends an indication to the BRL interface circuit 36 denying the action. In step 226, FIG. 7, the central control unit 24, FIG. 1, waits for the next event. If enough resources are available to make a call, then in step 228, FIG. 7, a check is made if the agent at the internal telephonic unit 32A, FIG. 1, has any other calls associated with any of the line keys 44A, 44B, 44C, FIG. 2, on the keyboard of the internal unit. The central control unit 24, FIG. 1, determines if any other calls connected with the internal telephonic unit 32A were answered by the agent at the internal unit. If no other calls are associated with the line keys 44A, 44B, 44C, then in step 230, FIG. 7, the outdial is performed.

If there are other calls connected with the internal telephonic unit 32A, FIG. 1, then in step 232, FIG. 7, a check is made if any calls are not on hold. If there are calls not on hold, the calls are placed on hold, in step 234, and the outdial is performed in step 230. In step 236, a check is made if one of the other calls received from another caller has placed the associated line at the internal telephonic unit 32A on hold. If no other caller has placed the the associated line for the call at the internal unit on hold, then in step 238, the outdial is performed. If an internal call connected to the internal telephonic unit 32A, FIG. 1, has the unit on hold, then in step 240, FIG. 7, a check is made if the agent at the internal unit has the internal call on hold, thus determining the existence of a reciprocal hold. If a reciprocal hold exists between the agent at the internal telephonic unit 32A and the internal caller, the outdial call request is performed at the internal telephonic unit.

If the received call and the agent at the internal unit 32A are not in a reciprocal hold, a check is made, in step 242, FIG. 7, to determine if the agent has any call in a reciprocal hold. If no reciprocal hold exists at the internal telephonic unit 32A, FIG. 1, the outdial request is denied in step 244, FIG. 7. If a reciprocal hold exists at the internal telephonic unit 32A, the outdial request is started and an outdial call is performed in step 246, FIG. 7.

Figure 8:
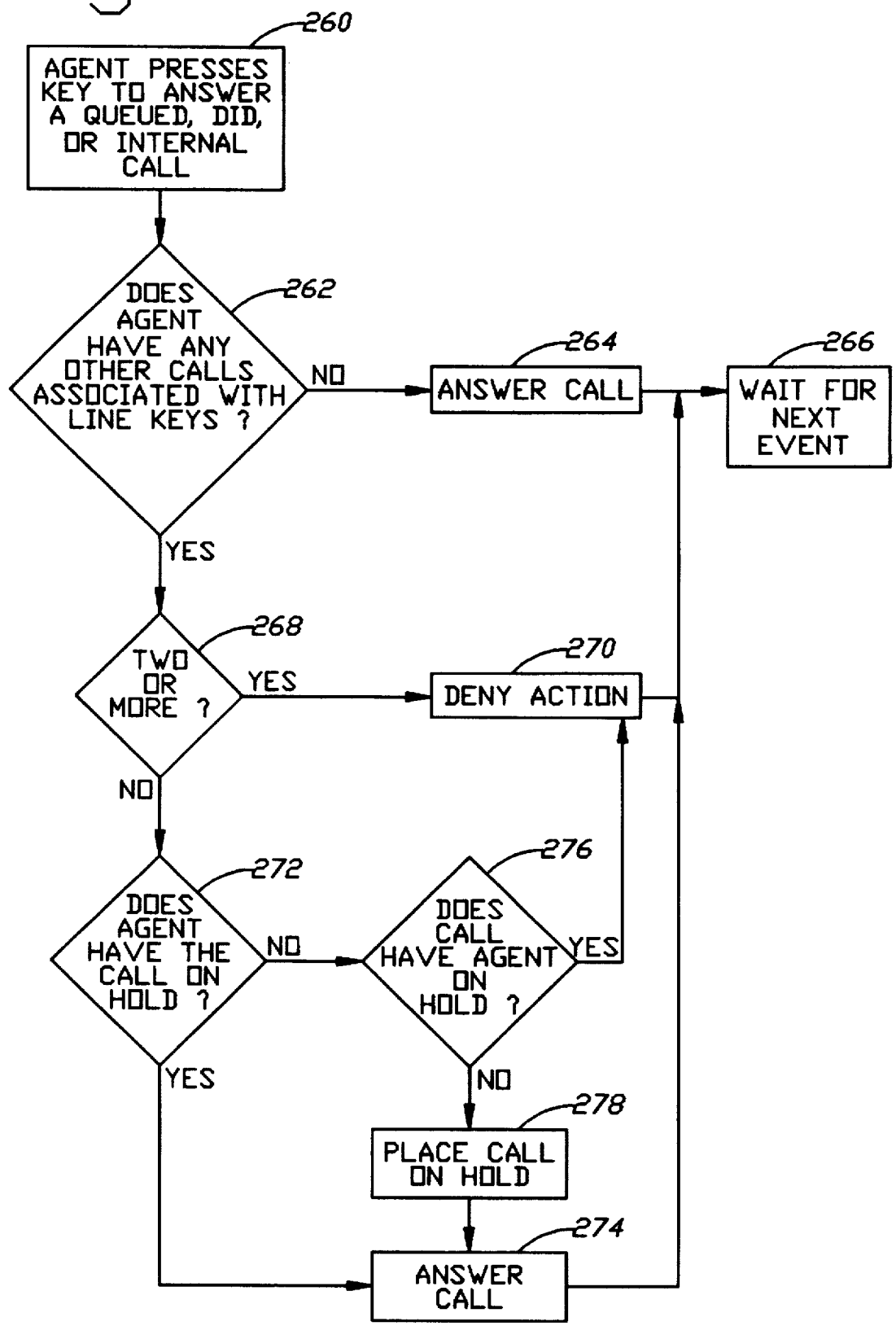
FIG. 8 is a flow chart of the preferred method of receiving and answering a queued call of the automatic call distributor at a multiline internal telephonic unit of the present invention.

Referring now to FIG. 8, in step 260, the agent at internal telephonic unit 32A actuates a programmable soft key 55, FIG. 2, to answer a queued direct inward dialing (DID) which is a telephonic call received from an external telephonic unit or another internal telephonic unit. The display screen 38 located directly above the programmable soft keys 55 of the internal telephonic unit 32A indicate the nature of the queued DID call as being an internal or external telephonic call. A check is made, in step 262, FIG. 8, to ascertain if the agent at the internal unit has any other calls associated with any of the line keys 44A, 44B, 44C, FIG. 2. The central control unit 24, FIG. 1, determines if the internal telephonic unit 32A has answered any received calls. If the agent at the internal telephonic unit 32A has no other calls, the queued call is answered, in step 264, FIG. 8. In step 266, the automatic call distributor 20, FIG. 1, waits for the next event.

If the agent at the internal telephonic unit 32A has other calls connected, then in step 268, FIG. 8, a check is made to determine if there are two or more calls connected at two or more telephone lines of the multiline internal telephonic unit. If two or more calls are connected, the action is denied in step 270. If two or more calls are not connected then the agent has one answered call, and a check is made in step 272 to determine if the call is on hold. If the one call at the internal unit 32A, FIG. 1, is on hold, the new queued DID or internal telephonic call is answered in step 274, FIG. 8. If the call is not on hold, then in step 276, a check is made to ascertain if the call connected at the internal unit 32A, FIG. 8, has the user on hold. If the connected call has the agent on hold, then in step 270, FIG. 8, the action is denied. If the call connected at the internal telephonic unit 32A does not have the unit on hold, the call is placed on hold and the queued call received at the internal unit is answered in step 274.

While a detailed description of the preferred embodiment of the invention has been given, it should be appreciated that any variations can be made thereto without departing from the scope of the invention as set forth in the appended claims.

I claim:

1. In an automatic call distributor having a multiport switch controlled by a central control unit for interconnecting telephonic calls received from external telephonic units of an external telephonic public switching network with internal telephonic units and for interconnecting telephonic calls from other internal telephonic units coupled with the call distributor, the improvement being a telephonic call holding system, comprising:

means for establishing a voice path connection between an internal telephonic unit and another internal telephonic unit over one of a plurality of lines in which both the internal telephonic unit are at the automatic call distributor and are connected to the multiport switch;

means at the internal telephonic unit for placing on hold the one of a plurality of lines of the other internal telephonic unit having the voice path connection; and means for enabling the other internal telephonic unit with the one of the plurality of lines being held to also put on hold the one of the plurality of lines being held by the internal telephonic unit.

2. The telephonic call holding system of claim 1 in which the enabling means only enables the other internal telephonic unit to also place on hold the one of the plurality of lines being held by the internal telephonic unit if at least one other line of the other internal telephonic unit has already been placed on hold at the other internal telephonic unit.

3. The telephonic call holding system of claim 2 including means for removing the at least one other line of the other internal telephonic unit from being on hold.

4. The telephonic call holding system of claim 3 including means responsive to the hold removing means for automatically placing on hold the one of the plurality of lines of the other internal telephonic unit that is being held by the internal telephonic unit.

5. The telephonic call holding system of claim 2 including means responsive to the enabling means for permitting the other internal telephonic unit to initiate an outdial telephonic call.

6. The telephonic call holding system of claim 2 including means responsive to the enabling means for transferring a telephonic call on the one other line of the other internal telephonic unit which has been placed on hold to a third internal telephonic unit.

7. The telephonic call holding system of claim 1 including means for connecting a telephonic call placed in a queue to the other internal telephonic unit only if the one of the plurality of lines put on hold by the other internal telephonic unit is only the one of the plurality of lines at the other internal telephonic unit having a different existing telephonic call associated with the plurality at lines of the other internal telephonic unit.

8. The telephonic call holding system of claim 2 including means associated with the other internal telephonic unit for indicating a call status on the at least one of the plurality of lines of the other internal telephonic unit.

9. The telephonic call holding system of claim 8 in which the call status indicating means includes means for providing a call status indication of at least one of a call condition of (a) a telephonic call being placed on hold on one of the plurality of lines at the other internal telephonic unit, (b) one of the plurality of lines being held on the other internal telephonic unit, (c) one of the plurality of lines is being held by the internal telephonic unit and also being placed on hold at the other internal telephonic unit, and (d) a telephonic call connection being on one of the plurality of lines of the other internal telephonic unit.

10. The telephonic call holding system of claim 9 in which the call status includes means including all of the plurality of conditions of (a)–(d).

11. The telephonic call holding system of claim 9 in which the call status indicating means includes a plurality of light signaling devices respectfully associated with a plurality of line keys on a keyboard of the other internal telephonic unit, each of said plurality of line keys corresponding to each of the lines of the internal telephonic unit, and a display screen on the other internal telephonic unit for visually displaying text information regarding the call status of the plurality of lines of the internal telephonic unit.

12. In a automatic call distributor having a multiport switch controlled by a central control unit for interconnecting telephonic calls received from external telephonic units of an external telephonic public switching network with internal telephonic units and for interconnecting telephonic calls received from other internal telephonic units coupled with the call distributor, the improvement being a telephonic call holding system, comprising:

means for placing a hole on one of a plurality of lines of one internal telephonic unit in which the one internal telephonic unit is at the automatic call distributor and connected to the multiport switch means for removing the hold placed on the one of the plurality of lines of the one internal telephonic unit; and means responsive to removing the hold placed on the one of the plurality of lines of the one internal telephonic unit for automatically placing another hold on another line of the one internal telephonic unit.

13. The telephonic call holding system of claim 12 including means for enabling the hold removing means to place the other hold on the other line of the one internal telephonic unit when the other line of the one internal teleDhonic unit is already being held.

14. The telephonic call holding system of claim 12 in which the hold removing means removes the hold placed on the one of the plurality of lines of the one internal telephonic unit if at least one other line is already being held at the one internal telephonic unit.

15. The telephonic call holding system of claim 13 including means responsive to the hold removing means for establishing a two way voice communication path on the one of the plurality of lines from which the hold in removed.

16. The telephonic call holding system of claim 13 including means responsive to the enabling means for permitting the internal telephonic unit to initiate an outdial call.

17. The telephonic call holding system of claim 13 including means responsive to the enabling means for transferring a telephonic call on the one of the plurality of lines of the internal telephonic unit in which the hold is removed to another internal telephonic unit.

18. The telephonic call holding system of claim 13 including means for connecting a telephonic call placed in a queue to the internal telephonic unit only if the other line already being held and placed on hold at the internal telephonic unit is the only line at the internal telephonic unit which is placed on hold.

19. The telephonic call holding system of claim 13 including means associated with the internal telephonic unit for indicating a call status on the plurality of lines of the internal telephonic unit.

20. The telephonic call holding system of claim 19 in which the call status indicating means includes a call status indication of at least one of a call condition of (a) a telephonic call being placed on hold on one of the plurality of lines at the internal telephonic unit, (b) one of the plurality of lines being held at the internal telephonic unit, (c) one of the plurality of lines both being held and being placed on hold at the internal telephonic unit, and (d) a telephonic call connection being on one of the plurality of lines of the internal telephonic unit.

21. The telephonic call holding system of claim 20 in which the call status indicating means including all of the plurality of the call conditions of (a)–(d).

22. The telephonic call holding system of claim 20 in which the call status indicating means includes a plurality of light signaling devices respectively associated with a plurality of line keys corresponding to each of the lines of the internal telephonic unit, said light signaling devices emitting different colored light and flashing at varying periodic rates to indicate different call status at their respective line keys, and a display screen on the internal telephonic unit for visually displaying text information regarding the call status of the plurality of lines of the internal telephonic unit.

* * * * *